(12) United States Patent
Sheng et al.

(10) Patent No.: US 12,152,651 B2
(45) Date of Patent: Nov. 26, 2024

(54) COMPACT LOW-FREQUENCY WAVE ABSORPTION DEVICE

(71) Applicant: The Hong Kong University of Science and Technology, Hong Kong (CN)

(72) Inventors: Ping Sheng, Hong Kong (CN); Zhen Dong, Hong Kong (CN)

(73) Assignee: THE HONG KONG UNIVERSITY OF SCIENCE AND TECHNOLOGY, Hong Kong (CN)

(*) Notice: Subject to any disclaimer, the term of this patent is extended or adjusted under 35 U.S.C. 154(b) by 821 days.

(21) Appl. No.: 17/270,218

(22) PCT Filed: Aug. 21, 2019

(86) PCT No.: PCT/CN2019/101812
§ 371 (c)(1),
(2) Date: Feb. 22, 2021

(87) PCT Pub. No.: WO2020/038409
PCT Pub. Date: Feb. 27, 2020

(65) Prior Publication Data
US 2021/0317896 A1 Oct. 14, 2021

Related U.S. Application Data

(60) Provisional application No. 62/764,958, filed on Aug. 22, 2018.

(51) Int. Cl.
*F16F 7/10* (2006.01)
*E04H 9/02* (2006.01)
(Continued)

(52) U.S. Cl.
CPC ............ *F16F 7/1022* (2013.01); *F16F 15/02* (2013.01); *H02K 7/025* (2013.01); *E04H 9/0215* (2020.05);
(Continued)

(58) Field of Classification Search
CPC .. F16F 7/1022; F16F 2222/08; F16F 2232/06; F16F 15/02; F16F 2230/0094; H02K 7/025; E04H 9/0215
See application file for complete search history.

(56) References Cited

U.S. PATENT DOCUMENTS 2,856,179 A * 10/1958 Hogan .................. F16F 7/1022
188/129
4,286,693 A * 9/1981 Sulzer .................. F16F 7/1022
368/125
(Continued)

FOREIGN PATENT DOCUMENTS

CN  103438142 A  12/2013
CN  104455203 A   3/2015
(Continued)

*Primary Examiner* — Bradley T King
*Assistant Examiner* — James K Hsiao
(74) *Attorney, Agent, or Firm* — Nath, Goldberg & Meyer; Jerald L. Meyer; Stanley N. Protigal (57) ABSTRACT

Rotational translation of an inertial mass rotor is used for providing damping of low frequency noise and vibration. An axial component is mounted so as to translate axial movement of an inertial linearly-displaceable member to rotational movement of an inertial mass rotor. The translation to rotational movement of the inertial mass rotor provides inertial amplification in the form of translational-rotational coupling. This enables the construction of a compact assembly, which allows light ultra-low frequency resonances to be concentrated, and which absorbs such low frequency noise energy.

19 Claims, 4 Drawing Sheets

(51) Int. Cl.
*F16F 15/02* (2006.01)
*H02K 7/02* (2006.01)

(52) U.S. Cl.
CPC ... *F16F 2222/08* (2013.01); *F16F 2230/0094* (2013.01); *F16F 2232/06* (2013.01)

(56) References Cited

U.S. PATENT DOCUMENTS

| | | | |
|---|---|---|---|
| 2007/0007780 A1* | 1/2007 | Lagiewka | F16F 7/1022 293/132 |
| 2011/0220443 A1* | 9/2011 | Ivanco | F16F 7/116 188/380 |
| 2016/0001621 A1* | 1/2016 | Kato | B60G 17/06 188/267 |
| 2017/0294828 A1* | 10/2017 | Chen | F16F 15/035 |
| 2017/0335916 A1* | 11/2017 | Fox | F16F 7/1022 |

FOREIGN PATENT DOCUMENTS

| | | | | |
|---|---|---|---|---|
| CN | 105782333 A | | 7/2016 | |
| CN | 105909725 A | | 8/2016 | |
| CN | 106286692 A | | 1/2017 | |
| CN | 107178574 A | * | 9/2017 | ............... F16F 7/00 |
| CN | 108350969 A | | 7/2018 | |
| CN | 108386475 A | * | 8/2018 | ............ F16F 7/1028 |
| IN | 104214295 A | | 12/2014 | |
| JP | 2002081493 A | * | 3/2002 | |
| RU | 2011117257 A | | 11/2012 | |

* cited by examiner

COMPACT LOW-FREQUENCY WAVE ABSORPTION DEVICE

RELATED APPLICATION(S)

This is a National Phase Application filed under 35 U.S.C. 371 as a national stage of PCT/CN2019/101812, filed Aug. 21, 2019, and claims priority to U.S. Provisional Patent Application No. 62/764,958 filed 22 Aug. 2018, which is assigned to the assignee hereof and filed by the inventors hereof. The content of each of which is hereby incorporated by reference in its entirety.

BACKGROUND

Technical Field

The present disclosure relates to low-frequency and seismic wave absorption used to harvest energy and remediating low frequency noise and vibrations.

Background

As used herein, the term "low frequency mechanical waves" denotes seismic waves, low frequency vibrations and noise in the range of 0.1 to 300 Hz. Such low frequency mechanical waves have very long wavelength and are especially difficult to block or to absorb, unless by using very large structures or bulky materials. By using resonances, metamaterials can be useful for their sub-wavelength sample size. For such low frequencies even the sub-wavelength resonances can require heavy masses that make them impractical.

Sound propagates through air adiabatically with little loss. In traditional sound absorption materials, dissipation is mainly localized at solid-air interface, through relative motion within the viscous boundary layer, as well as through heat conduction through solid that leads to the breakdown of the adiabatic character of sound propagation. This basic nature of sound/noise dissipation dictates that most of the conventional sound absorption materials, e.g., acoustic sponge, rock wool, or glass wool, are porous in structure, with a large surface to volume ratio so that there can be a large dissipation coefficient. Since the total absorption depends on the product of dissipation coefficient with the energy density, there has been a surge of interest in using acoustic metamaterials for sound absorption. Many of the novel properties of acoustic metamaterials arise from local resonances, which can give rise to large energy densities and hence efficient energy dissipation. In particular, acoustic metamaterials can absorb at low frequencies with extremely thin sample thicknesses, a feat that is beyond the reach of traditional absorbers.

The traditional porous absorbers and the acoustic metamaterial absorbers have drawbacks at low frequencies. Whereas the traditional absorbers have fixed absorption spectrum which can only be adjusted by varying the sample thickness, acoustic metamaterials have the Achilles' heel of an inherently narrow frequency band, owing to the local resonances responsible for metamaterials' properties. For example, while acoustic metamaterial can absorb almost perfectly at low frequencies with a very thin sample thickness, the absorption peak is inherently very narrow; i.e., extraordinary absorption was achieved only at a particularly design frequency; however, in most applications broadband absorption required. In traditional resonance-based attenuation systems, low frequency attenuation typically requires substantial mass. For the traditional absorbers, low frequencies typically constitute a problem since bulky samples are required for high absorption, which can be impractical in many applications.

Thus, in typical noise attenuation applications, two issues must be addressed:
1. Is there an ultimate lower boundary on sample thickness for a given wave absorption spectrum?
2. Can one broaden the absorption frequency spectrum of acoustic metamaterials by integrating multiple local resonators operating at different frequencies?

In practical application, the attenuation of ultra-low frequency wave energy is generally not addressed inasmuch as it falls in a no-man's land between massive or bulky structures or materials on one hand, and configurations intended for higher frequency attenuation or absorption on the other had. It is desired to provide noise, vibration and seismic attenuation using a configuration that does not result in significant bulk or significant weight.

SUMMARY

Damping of low frequency noise and vibration is accomplished with a linearly displaceable member and an inertial mass rotor. The inertial mass rotor is linked to the inertial linearly displaceable member so as to cause a translation of axial movement of the inertial linearly displaceable member to a rotational movement of the inertial mass rotor. The linkage provides inertial amplification in the form of translational-rotational coupling.

DETAILED DESCRIPTION

Overview

When a sound or electromagnetic wave is incident on the surface of a structure or material, there will be a response in the form of a reflected wave plus a wave penetrating into the structure or material. Such wave response must be causal in character, i.e., the wave response at any given moment can only depend on what happened before that moment. This is called the causal principle. In other words, future incident waves would not affect the current response. When expressed in mathematical language, this intuitive and trivial statement can have profound implications that cut across almost all areas of physics. An example of the causal principal was derived in the 1920s by Hans Kramers and Ralph Kronig, as a relationship between the real and imaginary parts of the electromagnetic dielectric function, known as the Kramers-Kronig relation. A lesser-known implication of the causal principle is the inequality linking the sample thickness to the electromagnetic wave absorption spectrum.

An acoustic version linking sample thickness to the electromagnetic wave absorption spectrum can be expressed as:

$$d \geq \frac{1}{4\pi^2} \frac{B_{eff}}{B_0} \left| \int_0^\infty \ln[1 - A(\lambda)] d\lambda \right| = d_{min}^*, \quad (1)$$

where $\lambda (=2\pi v_0/\omega)$ denotes the sound wavelength in air, with $v_0 = 340$ m/sec being the speed of air-borne sound, $\omega$ is the angular frequency of the wave, $A(\lambda)$ is the absorption spectrum, $B_{eff}$ is the effective bulk modulus of the sound absorbing structure at the static limit, $B_0$ is the bulk modulus of air.

One can interpret Eq. (1) to mean that for a given sample thickness d, there is a limited amount of absorption resources that is given by the integral indicated by the right hand side of Eq. (1). For an absorption spectrum that is centered at low frequencies, the required amount of sample thickness is much more than if the same frequency width of the absorption spectrum is centered at a higher frequency. Equation (1) essentially answered the first question posed above, which is the right hand side of Equation (1).

A related question is, whether it is possible to broaden the absorption frequency spectrum of acoustic metamaterials by integrating multiple local resonators operating at different frequencies. Previously, by focusing on waves normally incident on the absorption device, a frequency integration scheme was designed so as to achieve tunable, target-set absorption spectrum with minimum sample thickness. If such a scheme is applied to very low frequency vibrations and noise, the minimum sample thickness set by the causal constraint would still be too large for many practical applications. Hence the present disclosure converts the translational inertia to rotational inertia in order to enable the low frequency resonances with compact size and light weight.

By using the previously non-utilized directional degrees of freedom with inertial amplification, it is possible to implement an especially compact low frequency broadband wave absorption device that can harvest energy from seismic waves as well as from low frequency vibrations and noise in the range of 0.1 to 300 Hz. These devices are designed to be much smaller and lighter than the lower bound set by the constraints of the causal principle (causality constraint). Being compact and relatively light in weight can mean flexibility in their usage (e.g., in small confined spaces) as well as facility for low-cost mass production. These devices can also be used to remediate low frequency noise and vibrations arising from machines, transformers, or engines. They can benefit the environment, people living or working close to the low frequency vibrations or noise sources, and people living in earthquake zones.

At the frequency range of 0.1 to 300 Hz, the causality constraint described in the background section gives a minimum sample thickness that is so large (e.g., >50 cm) that it would be impractical for applications in most practical situations. The absorption spectrum used in the causality constraint integral is calculated or measured for plane waves incident on the sample either normally or within sixty degrees of the normal. For 90 degree incidence, the absorption is zero. Here the horizontal direction is defined as the support surface for the sample, and the latter is always assumed to be homogeneous along the horizontal direction on the macroscopic scale. This observation opens the possibility to design compact devices that can have lateral oscillations/resonances to capture the energy of ultra-low frequency waves, a degree of freedom previously not accounted for in the absorption structures, and which lies outside the limitation of the causal constraint.

It is well known that the most destructive seismic movements are horizontal. For other low frequency vibrations, the disclosed device will operate either in an open environment, for which the directionality of the source is well defined so that mounting becomes important, or in a confined environment where the directionality is less-clearly defined due to multiple scatterings. In the latter case one only needs an absorption sink in one particular direction to absorb most of the vibration energies since directionality equilibrium, in terms of multiply scattered energy, guarantees that the wave energies in all the directions are strongly coupled.

The present disclosure uses devices that are much more compact in dimension and significantly lighter in weight, in conjunction with very effective attenuation power. These attributes make them much easier to be mass produced, while also much more flexible in many real-life application scenarios.

In determining the amount of wave energy propagating along the horizontal direction to be attenuated and harvested, it is observed that, for seismic events, horizontal ground motions are the most damaging to buildings and structures. The described compact device, capable of absorbing and harvesting energy from horizontal excitations, is an ideal fit to attenuate the seismic waves. Moreover, in this ultra-low frequency regime the wavelength is so large that for all practical purposes, it can be assumed that the attenuation must occur in the near field of the source. In addition, if there are scatterers or obstacles nearby (which is very probable over such large distances), then there will be strong multiple scatterings and exchange of wave energy between different propagating directions, as well as between air/water/solid. As a result, there will be a lack of well-defined wave vector as in the plane wave case, and the difference between sound and vibration is no longer clear-cut.

Due to the lack of a well-defined vector due to multiple scatterings, e.g., from boundaries of a confined enclosure or obstacles, mechanical waves are used to denote the general category of sound and vibrations. This applies even if the device is sensitive to excitations only along the horizontal direction, energy can be fed from other directions owing to the strong directional coupling from multiple scatterings. This coupling can be further enhanced if the compact device is designed to be sensitive to vertical displacements as well, e.g., by converting vertical displacements into horizontal displacements through the mounting element on the bottom of the device that attaches to the vibration source. This particular element can translate vertical displacement into a closer separation between two oppositely-placed permanent magnets embedded in two soft rubber, sponge or other elastomeric pieces, thereby forcing the horizontal displacement of the device to restore the original separation between the two magnets.

The energy harvesting function of these devices provides an extra benefit in addition to remediating low-frequency sound/vibrations. The present disclosure describes devices for both the low frequency acoustic range (50 to 350 Hz) and seismic frequency range (0.4-2 Hz). These resonances can be utilized to attenuate wave power, on the order of several watts, which makes the energy harvesting effect of such devices quite promising. For a seismic absorption device, which can be buried underground in massive numbers (e.g., under and around buildings), considerable amount of energy can be generated for storage and usage in a 20-second earthquake.

The disclosed techniques may be used in living or working places where low frequency sound/vibrations are in need to be remediated, such as in aircraft, other vehicles, factories, etc. This disclosure also provides a unique approach useful for the absorption of seismic range vibration. Large numbers of seismic energy absorption devices can be buried under and around buildings for seismic power attenuation, thereby diminishing the destructive power. Advantages include:

- The disclosed techniques target lower frequency ranges than other sound absorbing designs, which reach to the seismic range. Even seismic range could be covered by the disclosed design of relatively compact and realistic device dimensions.
- The techniques provide compact and lightweight configurations, useful for a variety of applications, including by way of non-limiting example sound remediation of motor engines, airplanes and machinery.
- The techniques can be implemented with comparatively simple in structural design and material choices, which facilitates low cost mass production.

Construction

The following are non-limiting examples of configurations of compact low-frequency wave absorption devices. It is noted that the specific mechanical components are given by way of non-limiting example, and that equivalent mechanical components can be used to construct the basic unit to achieve the same physical behavior.

Figure 1A:
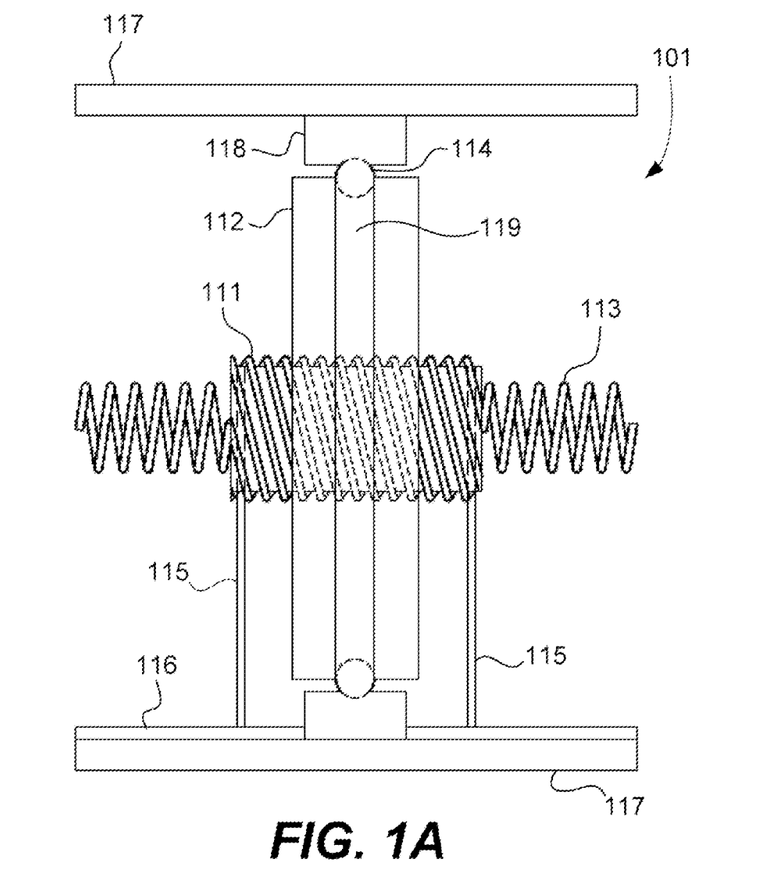
FIGS. 1A and 1B are schematic diagrams showing a basic unit of a mass-spring chain in side view (FIG. 1A) and end view (FIG. 1B).
Figure 1B:
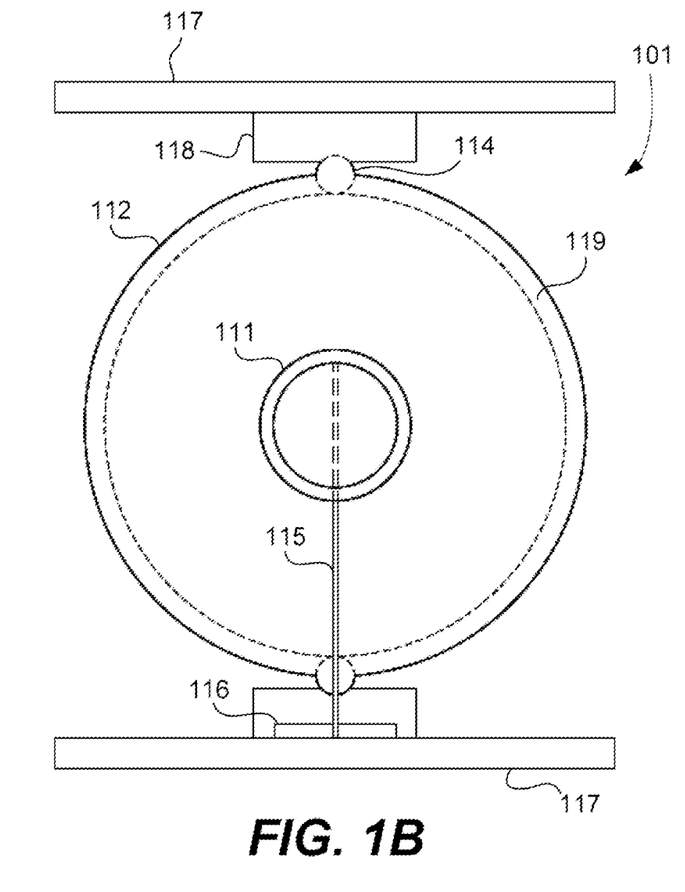

FIGS. 1A and 1B are schematic diagrams showing a basic unit 101 of a mass-spring chain, in side view (FIG. 1A) and end view (FIG. 1B). Shown are screw shaft 111, inertial mass rotor 112, spring 113, ball bearing 114, and a pin rod 115 and track 116. Also shown is outer casing 117, which forms a rigid frame, and ball bearing housing 118. Rotor 112 is provided with groove 119, which provides a track for bearing rotation and permits rotation motion of rotor 112. Rotor 112 may be formed of a soft rubber substrate, but the surface of groove 119 is formed of a material suitable for low friction bearing movement. Magnets (not shown in FIG. 1) are embedded in the substrate of casing 117. In terms of functionality, casing 117 performs the function of a support, housing or mount for the apparatus. Casing 117 may be a closed housing or an open platform or other support, according to design choice.

The moving parts of the mechanism are coated with a dry lubricant, such as a tungsten disulfide lubricant. The basic unit functions as a mass-spring oscillator and rotation movement significantly amplifies the effective mass of the oscillator. In determining resonance frequencies, a spring constant is assumed for spring 113. Screw 111 has a fixed radius and mass.

Screw shaft 111 functions as an inertial linearly-displaceable member. When there is translational motion, rotor 112 is restricted to only the rotational motion and is not moved axially by screw 111, while two pin rods 115 inserted into two ends of screw shaft 111 prevent rotation of screw shaft 111, so that the shaft is only subject to translational motion. The other end of pin rod 115 is will be confined to track 116, which allows the translational motion of pin rod 115. Ball bearing housing 118 has a spring mechanism (not separately shown) to urge ball bearing 114 outward. Pin rods 115 are confined in the base track that allows axial movement of the screw shaft but prevents screw shaft from counter-rotating in response to the rotation of the rotor. The base track is what provides the (reaction) torque to break the angular momentum conservation of the screw shaft-and-rotor system. Alternatively it is possible to use a sleeve bushing (not shown) rigidly mounted to the frame or casing 117. The result is that rotor 112 remains in an axially fixed position with respect to casing 117, with screw 111 moving axially with respect to casing 117. The axial movement of screw 111 causes rotation of rotor 112, which results in inertial amplification. The inertial amplification is due to the ratio between the moment of inertia and mass of rotor 112 and the reduction ratio of the screw threads.

While screw threads are described, it is understood that other techniques that effect translation of linear movement of a mass to rotational momentum can be used in order to provide a translation of the momentum from linear to rotational momentum.

The central requirement for a compact and light mechanical wave attenuation device is the enhanced sensitivity to such ultra-low frequency waves. Resonances can greatly enhance the sensitivity. Since low frequency resonance requires heavy weight, it is intended to use the concept of inertial amplification to reduce the necessary weight (by orders of magnitude) and size required for the low frequency resonators. The described design comprises three elements:

(1) the inertially-amplified mass and spring oscillator chain that can respond sensitively to the ultra-low frequency excitations,
(2) the energy conversion device, and
(3) the mounting of the device which can convert vertical pressure modulations into horizontal motions.

The first element of the design uses the inertial amplification concept, originally conceived to realize low frequency bandgaps in periodic structures, with lighter mass and smaller structures. The concept in the form of using helical grooves on a shaft (i.e., screw 111) is adopted to couple the linear motion to rotational motion of rotor 112, thereby significantly amplifying the effective mass as perceived by the oscillator. In the basic unit of the mass-spring oscillator, spring 113 is assumed to have a spring constant, screw 111 has a radius and rotor 112, forming the counterpart nut, provides mass. Rotor 112 is fixed in its axial position by ball bearings 114, fitted into a groove 119 in the rim of rotor 112. Screw 111 drives the other components (i.e., rotor 112 through screw threads) in response to the vibrations. The axial movement of screw 111 is driven by the horizontal oscillatory motion of the whole device, which provides an oscillatory accelerating frame. When there is translational motion, rotor 112 is restricted by screw 111 to only the rotational motion, restricted by the mounted ball bearings, while the two pins 115 inserted into the screw's two ends prevent its rotation; i.e., there is only translational motion for the shaft of screw 111. The pins' other ends are be confined to a trough 116 that allows the translational motion of pins 115. Casing 117 supports the assembly and supports ball bearing housing 118. Ball bearing housing 118 has a spring mechanism (not separately shown to push the ball bearing 114 outward.

Figure 2:
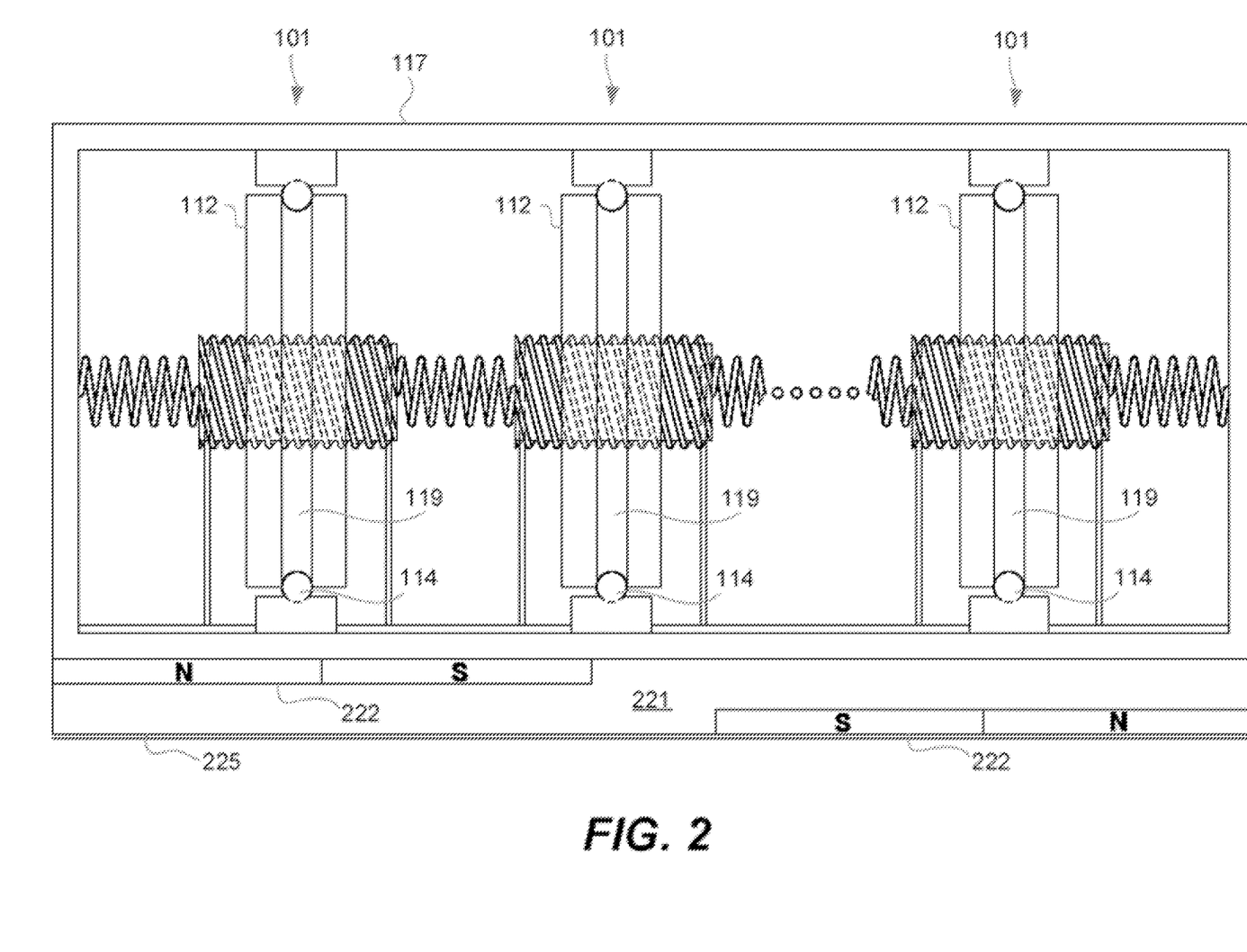
FIG. 2 is a schematic diagram showing a configuration of a wave absorption device using multiple basic units as shown in FIGS. 1A and B.

FIG. 2 is a schematic diagram showing a configuration of a wave absorption device using multiple basic units 101 as shown in FIGS. 1A and B. This configuration of multiple basic units 101 shows a whole set-up of the wave absorption device. Also shown are rubber layer 221 mounted on outer casing 117, with magnets 222 embedded therein, so that magnets 222 are embedded inside the rubber/sponge layer attached to the outer casing.

In such a setup, friction is obviously an issue. Commercialized tungsten disulfide ($WS_2$) lubricating coating is used, with a friction coefficient of 0.035, to coat all the interfaces between screws and shafts, and between the pin and the groove track. The tungsten disulfide is given by way of non-limiting example, as other suitable lubricants can be used to the same end.

To see the inertial amplification effect, the equation of motion for a mass-and-spring chain is used:

$$m_1 \frac{d^2 u_n}{dt^2} = \beta(u_{n+1} + u_{n-1} - 2u_n) - f_y, \quad (2)$$

where
$u_n$ denotes the displacement of the nth mass unit
$\beta$ denotes the spring constant.
$f_y$ denotes the force along the horizontal direction experienced by the screw as a result of its coupling to the rotor (the nut).

From the geometric condition $2\pi r_1 \cdot f_x = d \cdot f_y$, where d is the period of the screw thread, and the torque equation for the rotor, we obtain:

$$r_1 f_x = I_{m_2} \frac{2\pi}{d} \frac{d^2 u_n}{dt^2} = \frac{1}{2} m_2(r_1^2 + r_2^2) \frac{2\pi}{d} \frac{d^2 u_n}{dt^2} = \frac{\pi}{d} m_2(r_1^2 + r_2^2) \frac{d^2 u_n}{dt^2} \quad (3)$$

where
$I_{m_2}$ denotes the moment of inertia of the rotor.

The screw ($m_1$) is prevented from rotating with built-in designed constraint. Hence we have the usual mass-spring equation of motion:

$$\overline{m} \frac{d^2 u_n}{dt^2} = \beta[u_{n+1} + u_{n-1} - 2u_n], \quad (4)$$

where
$\overline{m} = m_1 + [2\pi^2(r_1^2 + r_2^2)/d^2]m_2 = m_1 + \gamma m_2$ denotes the inertially-amplified mass.

It can be seen that the amplification factor, denoted as $\gamma$, can be very large, so that $\overline{m}$ can be orders of magnitude larger than the actual mass $m_1 + m_2$, thereby realizing the goal of very low frequency resonances with light and compact devices.

The solution of Eq. (11) yields a range of frequencies for the whole device with N units, given by the following formula:

$$f = \frac{1}{\pi} \sqrt{\frac{\beta}{\overline{m}}} \left| \sin \frac{\pi l}{2(N+1)} \right|, l = 1, 2, 3 \ldots N. \quad (5)$$

Significantly, it is noted that the screw part is only allowed to have translational motion, and by doing so would drive the rotor. In the design there will be a pin inserted at each end of the screw, one end of the pin would be confined to a groove along the axial direction. This is for the purpose of providing the necessary torque to prevent $m_1$ from rotating (and to drive the rotation of $m_2$), while allowing for translational motion. In this inertial amplification mechanism, the dominant amount of the kinetic energy is concentrated in the rotational energy of the rotor. Thus energy dissipation/harvesting will be carried out on the rotor by installing electrical brushes on the edge of the rotor, to be used to touch and bend the piezoelectric strips when the rotor is in motion.

The second element of the device is the mounting, which should have the function of converting some of the vertical pressure modulations into horizontal motions. FIG. 2 schematically illustrates a very simple and reasonably inexpensive mounting setup at its bottom. Inside soft rubber layer 221 are two magnets 222, one fixed to the bottom of the casing 117 while the other is fixed to a mounting surface 225. The two magnets 222 are vertically separated, with the same poles pointing at each other, so that when the soft rubber layer is compressed, there is a strong repulsive force to move the whole device to the left. When the compression is lifted, the soft rubber will restore to its original thickness. With the decrease of the repulsive force, the whole device will be pulled by the elastic force of the rubber to the right, to its original position. In this manner for each cycle of compression-decompression the casing will experience a horizontal left-right motion cycle.

Figure 3A:
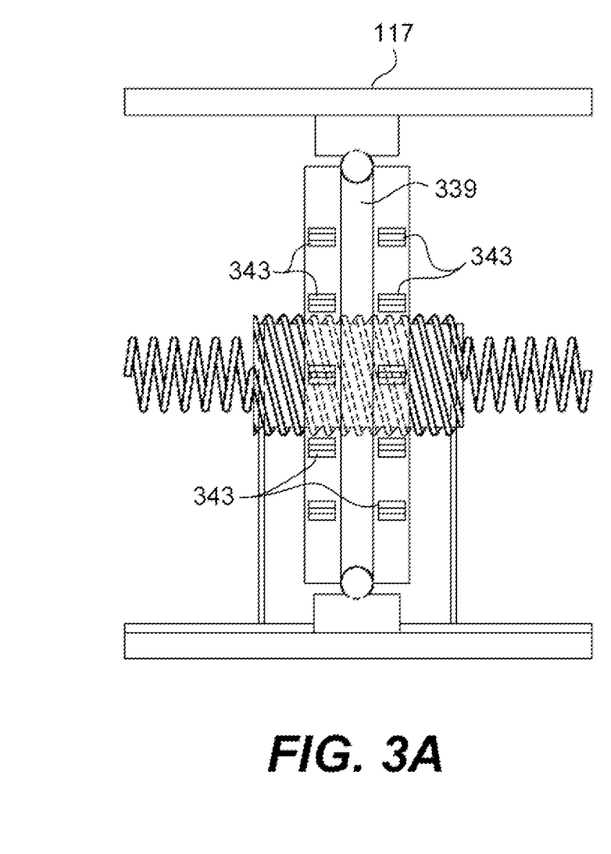
FIGS. 3A and 3B are schematic diagrams showing a basic unit after mounted with piezoelectric energy harvesting parts, in side view (FIG. 3A) and end view (FIG. 3B).
Figure 3B:
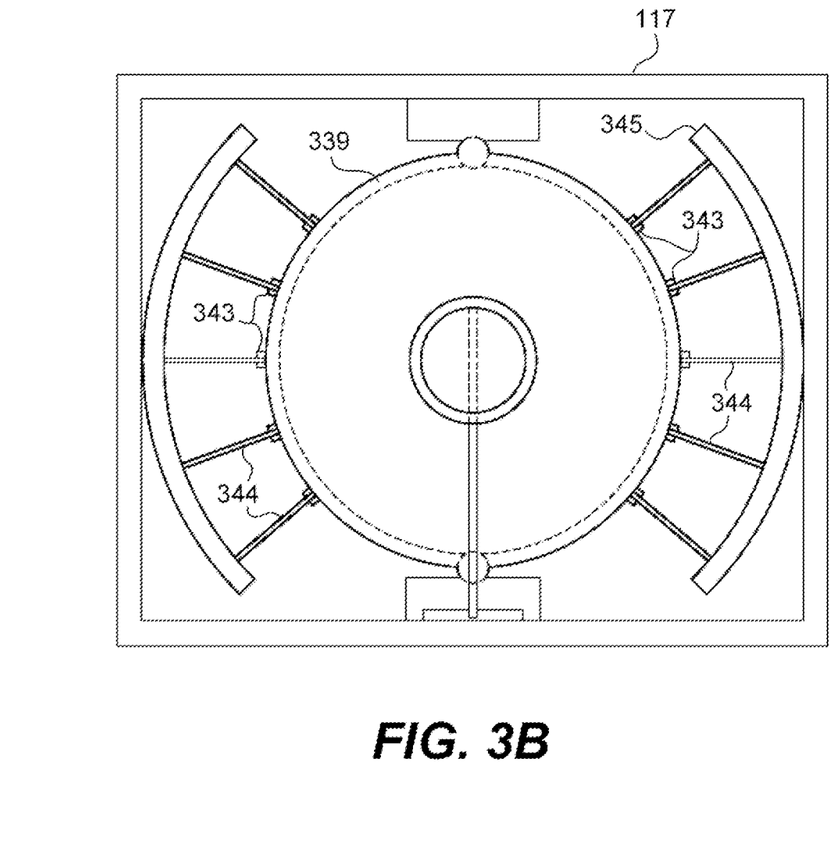

FIGS. 3A and 3B are schematic diagrams showing a basic unit after mounted with piezoelectric energy harvesting parts, in side view (FIG. 3A) and end view (FIG. 3B). Depicted are rotor 339 and attachments 343 attached to the outer edges of rotor 339. Attachments 343 provide physical connections between piezoelectric strips 344 and rotor 339, with outer supports 345 stabilizing the piezoelectric strips 344. Attachments 343 have no electrical connections to other parts, but rather function to bend the piezoelectric strips mounted on the device inner frame to cause the deformed piezoelectric strips to generate electricity as will be described in connection with piezoelectric energy harvesting. The bending the piezoelectric strips mounted on the device inner frame to make the deformed piezoelectric strips converts mechanical energy to electrical energy.

The third element of the device is energy conversion from the kinetic energy of the oscillating chain into electrical energy. This can be obtained by the use piezoelectric strips or patches that are commercially available and can used for the 50-350 Hz range. For the seismic frequency range of 0.4 to 1.8 Hz, standard Faraday's law is applied to generate the electricity from the kinetic energy of the rotor.

FIG. 3 illustrates how the piezoelectric energy harvesting parts are mounted onto the device. For the 50-350 Hz range absorption device, multiple piezo-strips 344 are installed surrounding each rotor of the chain. Those strips are fixed to the device frame at one end, while the other end can be bent by the attachments 343 on the outer edges of the rotor during its rotation. When that happens, the electrodes on the opposite surfaces of the strip can accumulate a voltage difference. The piezoelectric strips will be accompanied by rectifiers, capacitors, etc., to achieve the electrical energy storage.

Figure 4A:
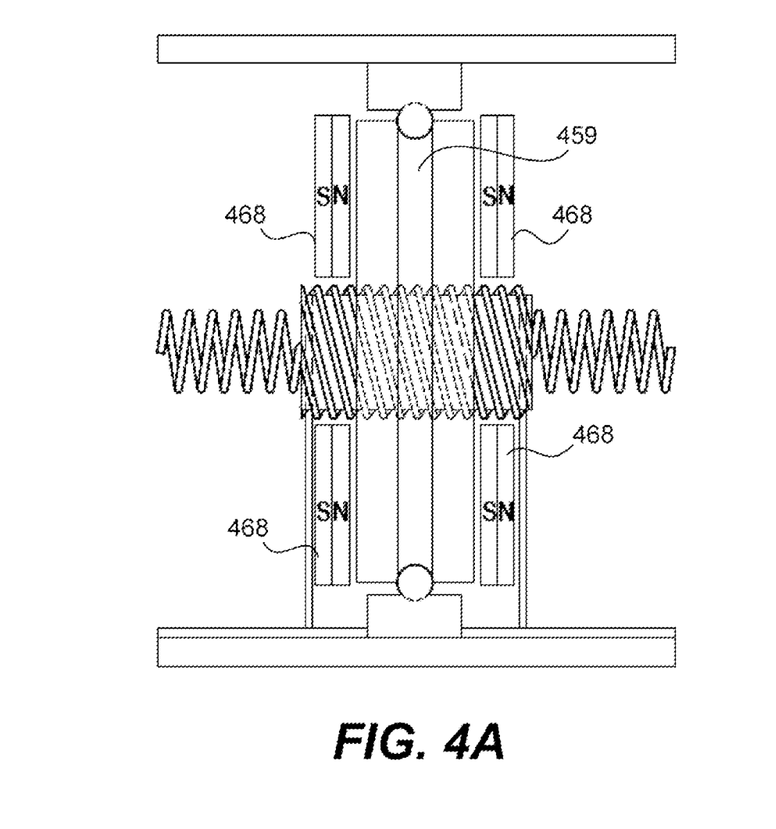
FIGS. 4A and 4B are schematic diagrams showing a basic unit after mounted with Faraday type energy harvesting parts, in side view (FIG. 4A) and end view (FIG. 4B).
Figure 4B:
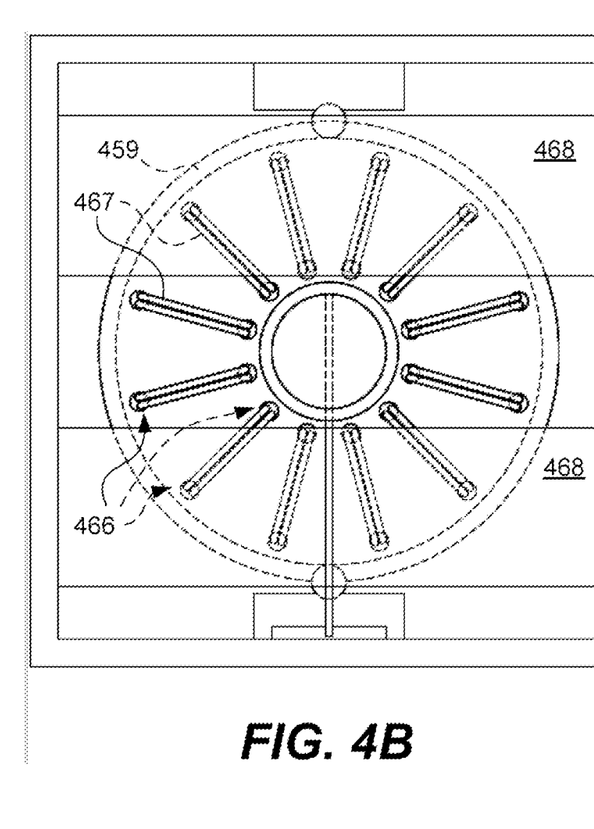

For the seismic absorption device, a Faraday type electric generating configuration may be used. FIGS. 4A and 4B are schematic diagrams showing a basic unit after mounted with Faraday type energy harvesting parts, in side view (FIG. 4A) and end view (FIG. 4B). Rotor 459 has openings 466, through which inducting coils or electrical windings 467 pass through. Permanent magnets 468 react with windings 467 to generate electrical energy. Openings 466 are provided in pairs around both the inner and outer edges of the rotor's two sides. Electrical windings 467 are wound through each pair of openings 466. Pairs of permanent magnets 468 are mounted onto the device frame with two opposite magnetic poles facing two sides of the rotor. When rotor 459 rotates, windings 467 interact with permanent magnets 468, thereby generating electricity in accordance with the Faraday's law. The generated electric current can be fed to storage circuit.

The storage circuit can be used in conjunction with other pre-existing grid storage elements. By way of non-limiting example, supercapacitor technology can be used to rapidly absorb energy, and then discharge the energy to other storage elements.

In order to fabricate the compact device, the frequency range of operation and its associated parameter values are first specified. By way of non-limiting example two frequency ranges: 50-350 Hz and 0.4-2 Hz are chosen. While the former is aimed at the attenuation of low frequency mechanical vibrations in vehicles, large electrical transformers, and other machines, the latter is targeted at seismic waves.

For a mass-spring chain of N=10 units, the maximum and minimum frequency range of the device can be deduced from Eq. (12) as:

$$f_{min}=0.045\sqrt{\beta/m}, f_{max}=0.32\sqrt{\beta/m}.$$

In the frequency range of 50-350 Hz, the following dimension parameters are set for the shaft and the rotor:
$\alpha=30°$, $r_1=1$ mm,
$l_1$ (length of $m_1$)=3 mm,
$d=2\pi r_1 \tan 20°=3.6$ mm,
$r_2=6$ mm, $l_2$ (length of $m_2$)=2 mm.

This leads to an amplification factor of $\gamma=55.5$, and an amplified mass for a single unit of:

$$\overline{m}=\rho(V_1+\gamma V_2)=\rho \cdot 12.2 \text{ cm}^3,$$

where $\alpha$ denotes the inclination angle of the screw.

Here two options are examined for choosing fabricating materials of the shaft and the rotor, without both options following one same dimension design described above. The first plan uses lighter material, 6061 aluminum alloy with density $\rho=2.7$ g/cm³, which yields $\overline{m}=33$ g. To meet with the desired 50-350 Hz frequency range, the steel spring's parameters are chosen to be wire diameter=0.08 mm, helical diameter=1.4 mm, helical period=0.7 mm, and total length=3 mm, so that one can have a spring constant of $\beta=39$ N/mm.

A second alternative is to replace aluminum with heavier stainless steel, of which $\rho=8$ g/cm³, which yields $\overline{m}=98$ g. Corresponding steel spring parameters are wire diameter=0.1 mm, helical diameter=1.3 mm, helical period=0.65 mm, and total length=3 mm, which yields a spring constant of $\beta=120$ N/mm.

Such a device is estimated to have the dimensions of:

6.7(length)×5.2(width)×2.4(height)cm³, with an overall weight of 80-110 g for the aluminium-core device or 100-130 g for the steel-core device, including energy harvesting components.

The maximum attenuation power for such a device ranges from 0.5 watt to 3.5 watts, respectively, for 50 Hz to 350 Hz for the aluminum alloy, and 1.5 watts to 10.4 watts, respectively, for 50 Hz to 350 Hz for the device made from stainless steel.

For the seismic frequency range of 0.4-1.8 Hz, N=6 units are used, with $$f_{min}=0.071\sqrt{\beta/m}, f_{max}=0.31\sqrt{\beta/m}.$$

The values of the parameters are:
$\alpha=15°$, $r_1=5$ mm,
$l_1$ (length of $m_1$)=3 mm,
$d=2\pi r_1 \tan 15°=8.4$ mm,
$r_2=60$ mm, $l_2$ (length of $m_2$)=17 mm.

This leads to an amplification factor of $\gamma=1010$, and an amplified mass for a single unit of $$\overline{m}=\rho(V_1+\gamma V_2)=\rho \cdot 0.16 \text{ cm}^3.$$

By using a spring with steel wire diameter=0.3 mm, helical diameter=0.5 mm, helical period=1.0 mm, and total length=35 mm, which yields a weaker spring constant of $\beta=49$ N/mm.

By using stainless steel with density $\rho=8$, we have m=1,536 kg. This directly yields $$f_{min}=0.4 \text{ Hz}, f_{max}=1.75 \text{ Hz}.$$

Such a device is estimated to have the dimensions of 46.9(length)×16.7(width)×13.8(height) cm³, with an overall weight of 23-24 kg, including the Faraday type energy harvesting component. Without the inertial amplification, the weight will be 1,542 kg for just one single unit. Such a weight and the associated size would be on the civil engineering construction scale; whereas with rotational movement, the device is less than 2 ft in length and weighs less than 25 kg, which is more manageable from a dimensional standpoint.

To have a rough idea about how much energy could be excited during the resonances for such mass-spring chain, an estimation of the maximum attenuation power of the device is made. For the 50-350 Hz range acoustic absorption device, the maximum compression length of springs was set to be 0.43 mm, while for the 0.4-1.8 Hz range seismic absorption device, was set to be 12 mm. Based on this, kinetic power values of the whole device corresponding to 10 or 6 resonant modes are listed in the form below. It is noteworthy to see that both devices could achieve as high as ~10 Watt attenuation power under previously stated assumptions. Even only 10% of this power can be converted to electricity and stored, the energy harvesting effect of such a device is still promising.

Table 1 shows estimated maximum attenuation power of the whole device, based on assumption for the maximum spring compression to be 0.43 mm (acoustic absorption device) and 12 mm (seismic absorption device).

TABLE 1

| 50-350 Hz acoustic absorption device with aluminium core | | | | | | | | | | |
|---|---|---|---|---|---|---|---|---|---|---|
| Frequency (Hz) | 50 | 99 | 146 | 190 | 230 | 266 | 196 | 320 | 337 | 348 |
| Power (Watt) | 0.5 | 1.0 | 1.5 | 1.9 | 2.3 | 2.7 | 3.0 | 3.2 | 3.4 | 3.5 |
| 50-350 Hz acoustic absorption device with steel core | | | | | | | | | | |
| Frequency (Hz) | 50 | 99 | 146 | 190 | 230 | 266 | 196 | 320 | 337 | 348 |

TABLE 1-continued

| Power (Watt) | 1.5 | 3.0 | 4.4 | 5.7 | 6.9 | 7.9 | 8.8 | 9.5 | 10.1 | 10.4 |
|---|---|---|---|---|---|---|---|---|---|---|

04-1.8 Hz acoustic seismic absorption device

| Frequency (Hz) | 0.4 | 0.8 | 1.1 | 1.4 | 1.6 | 1.8 |
|---|---|---|---|---|---|---|
| Power (Watt) | 2.5 | 4.8 | 7.0 | 8.7 | 10.0 | 10.9 |

To fabricate such compact devices, 3D printing may be used to provide initial prototypes of the components individually, which accommodates revisions and failures. The components of the energy harvesting part will be sourced and tested in samples, together with the necessary peripherals for electrical energy storage. After testing the 3D printed prototypes, it is possible to make the necessary molds so as to be able to make the components of the real device. After the actual components are made they would be coated with $WS_2$ lubricants and the components assembled into a fully functional form.

For testing, the device is first tested on a horizontally oscillating platform, with variable frequency. Whether the device can work or not can be detected by whether or not there is electricity generated. This should be a straightforward test, and for the seismic frequency regime, this will likely be the only test that will be practical. After passing the first round of testing, the next stage is to take it out and put multiple devices in a noisy source region, preferably close to the source, so as to detect the actual effect in both noise reduction/vibration remediation as well as energy harvesting. The noise level and vibration level before and after the installation of the multiple devices can be compared and the number of devices installed can be varied, to see the variation in the effect.

CONCLUSION

It will be understood that many additional changes in the details, materials, steps and arrangement of parts, which have been herein described and illustrated to explain the nature of the subject matter, may be made by those skilled in the art within the principle and scope of the invention as expressed in the appended claims. For example, while a screw thread is described for the translation of axial motion to rotational momentum, it is possible to achieve this function with other mechanisms, such as a lever system or other linear-rotational translation mechanism.

What is claimed is:

1. A method for providing damping of low frequency noise and vibration, the method comprising:
    integrating multiple local resonators operating at different frequencies by providing a plurality of mass-spring units in a chain to provide a mass-spring oscillator, the mass-spring units comprising:
        an axial component with a linearly-displaceable member;
        a housing mount formed as a rigid frame;
        an inertial mass rotor; and
        a spring having a spring constant selected to establish a resonance with the respective inertial mass rotor;
    linking respective ones of the inertial mass rotors to respective ones of the linearly-displaceable members so as to cause a translation of axial movement of the linearly-displaceable members to a rotational movement of the respective inertial mass rotor, thereby providing inertial amplification in the form of translational-rotational coupling significantly amplifying the effective mass of the inertial mass rotor, said inertial amplification in the form of translational-rotational coupling absorbing or harvesting low frequency noise and vibration energy at resonances established by respective ones of the inertial mass rotors and springs, the translational-rotational coupling comprising a connection responsive to vibration or movement and the inertial mass rotor, and
    mounting to the housing mount so as to restrain the inertial mass rotor in a manner to cause linear displacement of the inertial mass rotor responsive to vibration or movement by allowing the inertial mass rotor to linearly move with respect to the housing to translate through the translational-rotational coupling to rotational movement of the inertial mass rotor,
    wherein the plurality of mass-spring units are located within a rigid support or cover.

2. The method of claim 1, further comprising:
    mounting the inertial mass rotor on threads of the threaded linearly-displaceable member so as to cause a translation of axial movement of the threaded linearly-displaceable member to the rotational movement of the inertial mass rotor.

3. The method of claim 2, further comprising:
    maintaining the inertial mass rotor in at least a partially restrained axial position so that movement of the threaded inertial linearly-displaceable member forces rotation of the inertial mass rotor about the threads of the threaded-inertial linearly-displaceable member.

4. The method of claim 1, further comprising:
    extracting energy from the rotational movement of the inertial mass rotor.

5. The method of claim 1, further comprising:
    extracting energy from the rotational movement of the inertial mass rotor; and
    storing the extracted energy.

6. The method of claim 1, further comprising:
    extracting energy from the rotational movement of the inertial mass rotor by electromagnetic conversion of mechanical motion to electrical energy; and
    storing the extracted energy.

7. A low frequency noise and vibration damping apparatus comprising:
    multiple local resonators operating at different frequencies by providing a plurality of mass-spring units in a chain to provide a mass-spring oscillator, the mass-spring units comprising:
    a rigid support or housing;
    an inertial linearly-displaceable member supported within the support or housing;
    an inertial mass rotor supported on the internal linearly displaceable member;
    a linkage coupling the inertial linearly-displaceable member to the inertial mass rotor, linking the inertial linearly-displaceable member to the inertial mass rotor to cause axial movement of the inertial linearly-displaceable member to translate to a rotational movement of the inertial mass rotor, thereby providing inertial amplification in the form of translational-rotational coupling significantly amplifying the effective mass of the inertial mass rotor, said inertial amplification in the form of translational-rotational coupling absorbing or harvesting low frequency noise and vibration energy; and a restraint for the inertial mass rotor to restrain the inertial mass rotor in a manner to cause linear displacement of the inertial mass rotor responsive to vibration or movement by linearly moving with respect to the housing to translate through the linkage coupling to rotational movement of the inertial mass rotor, wherein the plurality of mass-spring units are located within the rigid support or housing.

8. The apparatus of claim 7, further comprising:

the inertial linearly-displaceable member comprising a threaded portion;

the inertial mass rotor having a threaded mounting portion for mounting the inertial mass rotor on the threaded portion of the inertial linearly-displaceable member to effect said coupling the inertial linearly-displaceable member to the inertial mass rotor so as to cause a translation of axial movement of the threaded inertial linearly-displaceable member to the rotational movement of the inertial mass rotor in response to axial movement of the inertial linearly-displaceable member.

9. The apparatus of claim 8, further comprising:

a support for the inertial mass rotor maintaining the inertial mass rotor in at least a partially restrained axial position so that movement of the threaded inertial linearly-displaceable member forces rotation of the inertial mass rotor about the threads of the threaded inertial linearly-displaceable member.

10. The apparatus of claim 7, further comprising:

the inertial linearly-displaceable member comprising an axial support shaft with a threaded mounting portion;

a mount fixing the axial support shaft at an axial position and permitting linear movement of the inertial linearly-displaceable member on the axial support shaft; and the inertial mass rotor having mating threads mating with the threaded mounting portion of the axial support shaft to support the inertial mass rotor on the threaded mounting portion while permitting rotational movement of the inertial mass rotor on the threaded mount so as to cause said translation of axial movement of the inertial linearly-displaceable member to the rotational movement of the inertial mass rotor.

11. The apparatus of claim 7, further comprising:

an energy conversion or absorption mechanism capable of extracting energy from the rotational movement of the inertial mass rotor.

12. The apparatus of claim 7, further comprising:

an energy conversion or absorption mechanism capable of converting energy from the rotational movement of the inertial mass rotor to electrical energy; and an energy storage circuit to capture the electrical energy.

13. The apparatus of claim 7, further comprising:

a biasing mechanism for biasing the axial support shaft toward a neutral position.

14. An apparatus for providing damping of low frequency noise and vibration, comprising:

multiple local resonators operating at different frequencies by providing a plurality of mass-spring units in a chain to provide a mass-spring oscillator, the mass-spring units comprising:

a rigid support or housing;

inertial means responsive to vibration or movement by linearly moving with respect to the support or housing, the inertial means comprising;

an inertial mass rotor;

a spring having a spring constant selected to establish a resonance with the respective inertial mass rotor; and translational-rotational coupling means for translating the linear movement of the inertial means to a rotational movement of the inertial mass rotor the translational-rotational coupling means providing a connection between the inertial means responsive to vibration or movement and the inertial mass rotor to absorb low frequency noise and vibration energy at resonances established by respective ones of the inertial mass rotors and springs; and means to mount the inertial mass rotor so as to restrain the inertial mass rotor in a manner to cause linear displacement of the inertial means responsive to vibration or movement by linearly moving with respect to the housing to translate through the translational-rotational coupling means to rotational movement of the inertial mass rotor, wherein the plurality of mass-spring units are located within the rigid support or housing.

15. The apparatus of claim 14, further comprising:

the inertial means responsive to vibration or movement by linearly moving with respect to the support or housing comprising a linearly-displaceable member; and means for maintaining the inertial mass rotor in at least a partially restrained axial position so that movement of the linearly-displaceable member forces rotation of the inertial mass rotor about the inertial means responsive to vibration or movement by linearly moving with respect to the support or housing.

16. The apparatus of claim 14, further comprising:

providing, as the translational-rotational coupling means, a threaded connection between the inertial means responsive to vibration or movement and the inertial mass rotor; and means to mount the inertial mass rotor so as to restrain the inertial mass rotor in a manner to cause linear displacement of the inertial means responsive to vibration or movement by linearly moving with respect to the housing to translate through the translational-rotational coupling means to rotational movement of the inertial mass rotor.

17. The apparatus of claim 14, further comprising:

means for absorbing, or extracting energy from the rotational movement of the internal mass.

18. The apparatus of claim 14, further comprising:

an energy conversion or absorption mechanism capable of converting energy from the rotational movement of the inertial mass rotor to electrical energy by electromagnetic conversion of mechanical motion to electrical energy; and an energy storage circuit to capture the electrical energy.

19. A low frequency noise and vibration damping apparatus comprising:

a rigid support or housing;

an inertial linearly-displaceable member supported within the support or housing;

an inertial mass rotor supported on the internal linearly displaceable member supported within the support or housing;

a linkage coupling the inertial linearly-displaceable member to the inertial mass rotor, the linkage coupling establishing a translational-rotational coupling means providing a connection responsive to vibration or movement and the inertial mass rotor linking the inertial linearly-displaceable member to the inertial mass rotor to cause axial movement of the inertial linearly-displaceable member to translate to a rotational movement of the inertial mass rotor, thereby providing inertial amplification in the form of translational-rotational coupling significantly amplifying the effective mass of the inertial mass rotor, said inertial amplification in the form of translational-rotational coupling absorbing or harvesting low frequency noise and vibration energy to remediate low frequency noise and vibrations and generate electricity by piezoelectric energy harvesting; and a restraint for the inertial mass rotor to restrain the inertial mass rotor in a manner to cause linear displacement of the inertial mass rotor responsive to vibration or movement by linearly moving with respect to the housing to translate through the linkage coupling to rotational movement of the inertial mass rotor, wherein the plurality of mass-spring units are located within the rigid support or housing.

\* \* \* \* \*

UNITED STATES PATENT AND TRADEMARK OFFICE
CERTIFICATE OF CORRECTION

PATENT NO. : 12,152,651 B2
APPLICATION NO. : 17/270218
DATED : November 26, 2024
INVENTOR(S) : Ping Sheng and Zhen Dong Page 1 of 1

It is certified that error appears in the above-identified patent and that said Letters Patent is hereby corrected as shown below:

In the Claims

Claim 3, Column 12, Line 40, please remove the word "intertial".
Claim 3, Column 12, Line 42, please remove the word "intertial".

Signed and Sealed this
Seventh Day of January, 2025

Derrick Brent
*Acting Director of the United States Patent and Trademark Office*